Oct. 12, 1937.     C. A. SWANSTROM     2,095,271
FASTENING MEANS
Filed Jan. 27, 1936
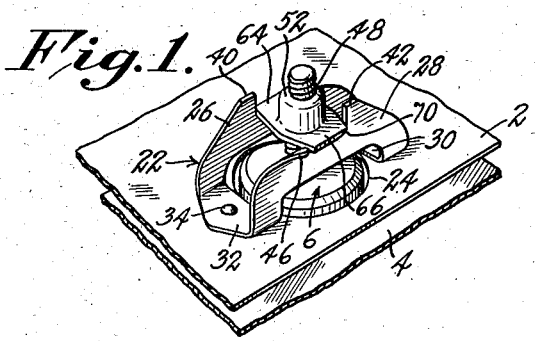
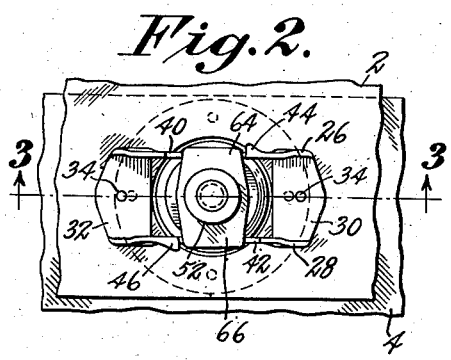
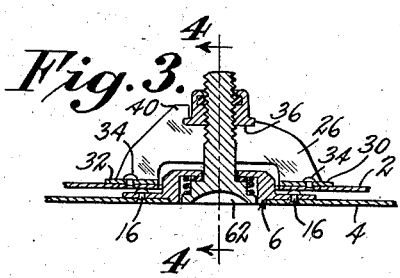
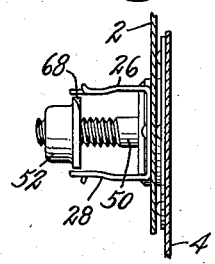
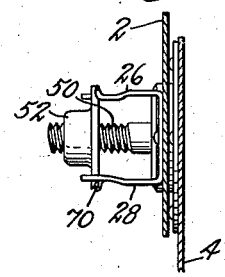
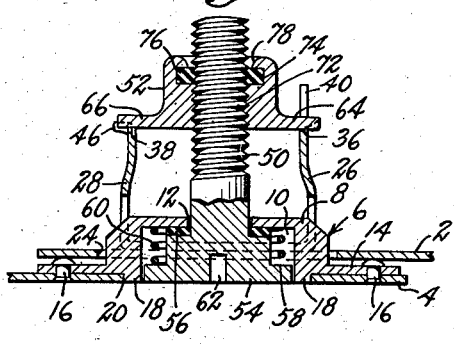
INVENTOR,
Carl A. Swanstrom
BY
his ATTORNEY.

Patented Oct. 12, 1937

2,095,271

UNITED STATES PATENT OFFICE 2,095,271

FASTENING MEANS

Carl A. Swanstrom, Irvington, N. J., assignor to Elastic Stop Nut Corporation, Elizabeth, N. J., a corporation of New Jersey Application January 27, 1936, Serial No. 60,952

13 Claims. (Cl. 24—221)

The present invention relates to fastening means and has particular reference to fastening means for detachably securing together different bodies or parts which may be conveniently referred to as primary and secondary structures. Still more particularly the invention relates to fastening means for securing together primary and secondary structures which are in the form of plates having overlapping portions, and still more particularly the invention relates to fastening means for securing together thin plate structures such as airplane cowling and other like parts.

Among the several objects of the invention are: to provide improved fastening means which will permit ready detachment of the structural parts from each other and which will be positive in its securing of the parts together; to provide improved fastening means which may be readily applied to any form of sheet structure; to provide improved fastening means permitting the ready attachment and detachment of parts from structures in which the reverse side of the primary structure is inaccessible; to provide improved fastening means having a structure providing a telltale giving positive indication of the engagement or non-engagement of the fastening means; to provide improved fastening means wherein no part of the fastening structure protrudes from the surface of the secondary structure held thereby; to provide improved fastening means which provides for direct transfer of shear stresses from the primary to the secondary bodies secured by the fastening means and which relieves the clamping parts of the fastening means of lateral bending or shear stresses; to provide improved fastening means which when engaged is fluid tight; and to provide improved fastening means of simple and cheap construction and which may be quickly and cheaply applied to the structure to be secured thereby.

For a better understanding of the nature of the invention and the manner in which the above and other objects of the invention are attained, reference may best be had to the ensuing description of a preferred form of apparatus embodying the invention, illustrated in the accompanying drawing, in which:

Fig. 1 is a perspective view showing the fastening means applied to plate structure;

Fig. 2 is a plan view from the rear or reverse side, of the structure shown in Fig. 1;

Fig. 3 is a section taken on the line 3—3 of Fig. 2;

Fig. 4 is a section on somewhat larger scale taken on the line 4—4 of Fig. 3;

Fig. 5 is a transverse view partly in section showing the parts of the device in disengaged and disassembled position;

Fig. 6 is similar to Fig. 5 showing the parts in assembled relation and in disengaged position; and Fig. 7 is a view similar to Fig. 5 showing the same parts in engaged relation.

Referring now to the drawing, the primary structure is indicated at 2 and for purposes of illustration this structure has been shown in the form of a thin plate although it will be understood that the specific character of the primary structure is not limiting upon the invention. The secondary structure, to be detachably secured to the primary structure, is indicated at 4 and has also been shown for purposes of illustration as a thin plate. It will be understood that the secondary structure as well as the primary structure may be of other than plate form. The invention is, however, of particular utility for securing together thin plate structures of the kind disclosed, as for example in aircraft construction where the primary plate 2 may be a portion of the wing or fuselage and the plate 4 a part of detachable cowling, cover plate or the like.

The fastening means comprises a socket member indicated generally at 6 and consisting of a cup like central portion 8, preferably circular in cross section, and providing a cylindrical recess 10 at the bottom of which there is the opening 12. Extending from the central cup portion of the member 6 is a circular flange 14 adapted to be secured to the rear or reverse face of the plate 4. In the embodiment illustrated, rivets 16 are employed but it will be understood that other means may be employed for this purpose. An annular flange 18 projects forwardly from the face of the flange 14 and engages the walls of an opening 20 in the plate 4. Preferably the opening 20 is in the form of a circular hole and the flange 18 is advantageously also circular with an outer diameter coinciding with the diameter of the hole 20 so as to provide a snug fit between the parts. As will be observed most clearly in Fig. 4, the height of the flange 18 is such that its face is flush with the front or outer face of the plate 4. The outer face of member 6 may for convenience be said to be countersunk.

A bridge member 22 is adapted to bridge an opening 24 in the primary plate 2, the opening 24 being advantageously in the form of a circular hole and of somewhat larger diameter than the outer diameter of the central cup portion 8 of member 6. Member 22 comprises two bridge portions or arms 26 and 28 and these portions are joined at their ends by the base portions 30 and 32 adapted to be secured to the plate 2 at diametrically opposite sides of the opening 24. In the embodiment shown, the base portions are secured to the plate 2 by means of rivets 34. Other securing means may be employed. Advantageously the bridge member 22 is made as an integral part from sheet stock stamped to the desired form with the bridge arm portions parallel to and spaced from each other and extending at right angles to the plane of the base portions 30. The bridge arms 26 and 28 are provided with engaging surfaces 36 and 38 respectively (Figs. 3 and 4), these surfaces being preferably located centrally over the opening 24 and advantageously parallel to the plane of the base portions of the bridge member. Arm 26 is provided at one end of the engagement surface 36 with an upstanding lug 40 forming a stop and arm 28 is provided with lug 42 providing a stop at the end of the engagement surface 38 opposite the end of surface 36 where the stop is provided by lug 40. Lugs 40 and 42 may be said to be diagonally opposite each other.

At the ends of the engagement surfaces 36 and 38 opposite the ends where the lugs 40 and 42 are located the bridge arms are provided with small lips 44 and 46 respectively, which are advantageously formed to provide beveled surfaces by bending the lips outwardly as shown in Figs. 1 and 2. These lips project upwardly a short distance above the plane of the engaging surfaces and provide latches for a purpose to be explained later.

A clamping member indicated generally at 48 is formed by a screw threaded bolt 50 and a nut 52 of the frictionally engaged self-locking type. Bolt 50 is provided with a head 54 adapted to be received in the recess 10 in the socket member, the inner face of the head being advantageously fitted with a fiber washer 56 or the like for sealing the joint between the bolt head and the bottom of the socket member. The thickness of the bolt head is preferably made such that its outer face is flush with the outer face of the flange 18 and with the outer face of plate 4 when the bolt is in engaged position. The bolt head is further shouldered as at 58 and a spring 60, which may be relatively light and of little strength, is interposed in the recess 10 between the shoulder 58 and the bottom of the recess.

A slot 62 is formed in the head of the bolt and this slot is advantageously arcuate in form and relatively wide so that it may be engaged by a coin.

The nut 52 may be said to be a wing nut having oppositely extending wings 64 and 66 adapted to engage the engagement surfaces 36 and 38 of the bridge member when the nut is positioned transversely of the latter member. Wings 64 and 66 are advantageously tapered slightly toward their ends as is shown in Fig. 2, and in a direction transverse to the length of the wings the nut is somewhat narrower than the space between the bridge arms 26 and 28, so that when the nut is turned to a position at right angles to the position shown in Fig. 2 (as in Fig. 6), the nut may pass readily between these arms and through the opening 24 in the primary plate structure. Further, the diagonally opposite corners of wings 64 and 66 are advantageously beveled on their under sides as indicated at 68 and 70.

The nut 52, as previously mentioned, is of the frictionally engaged self-locking type and advantageously embodies the features of construction disclosed in U. S. Patent No. 1,550,282, granted to Ture Gustaf Rennerfeldt on August 18, 1925. In accordance with this form of construction, the nut is provided with a differential bore, the lower portion of which is threaded as at 72 to engage the threads of the bolt 50. Above the threaded portion of the bore a portion of larger diameter provides a recess 74 in which an unthreaded washer 76 of fiber or the like is locked by means of the inturned flange 78 at the upper end of the nut. The original diameter of the hole through the washer 76 is slightly less than the diameter of the bolt threads, which force their way through the material of the washer when the nut is screwed onto the bolt. As fully explained in said patent, the action of the washer results in firmly holding together the threaded parts so that the nut will remain in engagement with the bolt without turning, even when the assembly is subjected to vibration of the most severe character. At the same time, the nut and bolt may be turned relative to each other with the application of comparatively little mechanical force to advance or retract the nut along the length of the bolt. Furthermore, the characteristics of this type of construction are such that the bolt may be removed from the nut and reinserted many times without in any way impairing the self-locking characteristics of the nut.

While I consider the above described form of self-locking nut to be preferable, it will be understood that other forms of self-locking nut may be employed within the scope of the invention.

Referring particularly to Figs. 5 to 7, the manner in which the fastening device embodying the present invention operates will be evident from these figures. In Fig. 5, the primary and secondary structures are shown with the bridge and socket members attached thereto and with the parts in proper position preparatory to securing the two structures together. In this position, the bolt 50 is retracted by spring 60 with the head projecting outwardly from plate 4 and with the nut 52 bearing on the socket member 6, the wings of the nut being in alignment with the channel formed between the arms 26 and 28 of the bridge member. With the parts positioned in this manner, the two plates 2 and 4 are brought into the relative positions they occupy when secured together, the central cup portion 8 of the socket member passing through the opening 24 in the primary plate structure 2, as shown in Fig. 6. With the parts so placed, the clamping member comprising the bolt 50 and nut 52 is turned, the two parts moving as an integral member under the influence of the frictional engagement between them provided by the locking washer 76. When the clamping member is turned, the wings pass over the lips 44 and 46 on the bridge arms and continue to turn until further rotation of the nut is stopped by contact of the wings with the stops 40 and 42. After rotation of the nut has been halted by the stops, further rotation of the bolt 50 causes the nut to advance along the bolt until the wings 54 and 56 engage the engagement surfaces 36 and 38 to secure the primary and secondary structures together.

To disengage the structures, the bolt 50 is turned in the opposite direction and initial turning of the bolt causes the nut 52 to be retracted along the threads of the bolt for a short distance because of the engagement of the wings with the lips 44 and 46. A relatively small amount of turning movement of bolt 50 will serve to retract the nut to a position where, with the bolt head seated against the bottom of the recess in the socket member, the wings will clear the relatively low lugs provided by these lips and thereafter the nut will turn with the bolt to the position shown in Fig. 6. When in this position, the fastening means is released and the secondary structure may be detached from the primary structure as shown in Fig. 5.

The construction provides numerous important practical advantages which will be apparent to those skilled in the art and some of the more important of which I will now point out.

One of the important desirable characteristics of fastening means of the character described for airplane construction is that it shall be air tight. This is of particular importance in connection with the construction of fuselage structure for high altitude aircraft. By reference to Fig. 4, it will be evident that the construction provided by the present invention fulfills this requirement very readily and in an inexpensive manner. The joint between the outer plate structure and the socket member is of a permanent nature and may readily be made air tight by application of some suitable compound or a suitable sealing gasket between the plate 4 and the flange 14, which provides a comparatively large surface contact between these two parts.

When the structure is in fastened position as shown in Fig. 4, it will be evident that the washer or other gasket member 56 between the bolt head and the bottom of the cup serves to effectively seal the structure against flow of air through the bolt opening. Since this gasket washer is around the bolt, and the bolt in normal circumstances is retained by the nut against dropping out of the socket member regardless of whether the fastening means is or is not in engaged position, there is substantially no danger of this sealing element being inadvertently lost.

It will be noted that when the fastening means is in engaged position, the strain is taken up entirely by tension on the bolt and that the spring 60 carries no part of the load if the parts are properly drawn together in firmly secured relation. Moreover, in each case when the parts are brought into engaged relation, pressure is exerted on the sealing means to insure against air leakage. The spring 60, however, has several useful functions. In the first place, it provides a positive tell-tale, indicating at a glance whether or not the fastening means is in engaged position or disengaged. In the second place, the spring will act to hold the wings of the nut in contact with the engagement surfaces 36 and 38 between the lugs 40 and 42 and the lips 44 and 46, if for any reason the bolt is not drawn home properly or if the distance between the engagement surfaces and the seat for the bolt head varies. In the third place, this spring may if desired function as a cushion.

By making the opening in the primary plate somewhat larger than the diameter of the central cup portion of the socket member, it is possible to readily insert the socket member so as to secure together the primary and secondary structures even though they are not exactly in their proper lateral positions with respect to each other. At the same time the wings on the lock nut are of sufficient length so that when the nut is in engaged position the wings will rest on the engagement surfaces regardless of variations in lateral position of the cup of the socket member within the opening in the primary plate. The flange 18 on the socket member constitutes what may be termed a shear flange to which lateral or shearing stresses from the secondary plate structure 4 are transmitted to the socket member which in turn can by contact with the periphery of the opening 24 in the primary structure, transmit such stresses directly to this structure without causing either bending or shear stress to be imposed upon the bolt or nut. The length of the wings on the nut and the length of the engagement surfaces on the bridge member relative to the width of the nut wings are both such that the nut may move laterally with respect to the surfaces, while still remaining in engagement therewith, to the extent that lateral movement of the bolt is permitted by movement of the cup portion of the socket member within the confines of the opening in the primary plate. By transmitting shear stress directly to the primary plate from the socket member, not only is shear stress on the bolt and nut structure avoided but such stress is also not transmitted to the bridge member which is thus subjected only to compression. Because of this fact the bridge member may be of relatively light material since under no circumstances are the bridge arms subjected to lateral stresses which might tend to bend them.

While in compliance with the patent statutes I have illustrated and described by way of example a preferred form of structure embodying the invention, it will be evident that departures from the structure shown may be made within the scope of the invention which is to be considered as embracing all structures falling within the terms of the appended claims when construed as broadly as consistent with the state of the prior art.

I claim:

1. A fastening device including a bridge member adapted to be secured to a primary structure and to bridge an opening in said structure, said member having spaced engagement surfaces thereon, a socket member adapted to be secured to a secondary structure, and a clamping member for detachably locking together said bridge member and said socket member, said clamping member comprising a screw threaded bolt having a head adapted to engage said socket member and a self-locking wing nut having wings adapted to engage said engagement surfaces to draw said members together as the nut is threaded toward the head of the bolt.

2. A fastening device including a bridge member adapted to be secured to a primary structure and to bridge an opening in said structure, said member comprising a pair of spaced bridge arms each having an engagement surface and a stop at one end of the engagement surface, a socket member adapted to be secured to a secondary structure, and a clamping member for detachably locking together said bridge member and said socket member, said clamping member comprising a screw threaded bolt having a head adapted to engage said socket member and a self-locking wing nut including an element frictionally engaging said bolt, said wing nut being adapted to pass between said bridge arms and to turn with said bolt to a position with said wings in engagement with said stops so that the wings are brought into engagement with said engagement surfaces upon further turning of said bolt after the wings come into engagement with said stops.

3. A fastening device including a bridge member adapted to bridge an opening in a primary structure, a socket member adapted to be secured to a secondary structure and having a cup-like portion adapted to project through said opening in the primary structure when said structures are in assembled relation, and a clamping member comprising a bolt and a nut for detachably locking together said bridge member and said socket member, said nut and said bridge member having cooperating engagement surfaces for causing said members to be drawn together as said nut is threaded toward the head of the bolt and said surfaces permitting lateral movement of the nut relative to the bridge member, and said cup like portion of the socket member engaging the wall of the opening in the primary structure upon lateral movement of the primary and secondary structures relative to each other whereby to transmit shear stress from one structure to the other through said socket member and to relieve said clamping member and said bridge member of lateral stress.

4. A fastening device including a bridge member adapted to be secured to a primary structure and to bridge an opening in said structure, a socket member adapted to be attached to a secondary structure and a clamping member for detachably locking together said bridge member and said socket member, said clamping member comprising a screw threaded bolt having a head and a self-locking wing nut threaded on the bolt, said bolt passing through said socket member and having its head received in a recess in the socket member and said bridge member having engagement surfaces for engagement with the wings of said nut in a predetermined position of rotation of the nut and stop surfaces for preventing rotation of the nut beyond said predetermined position when the bolt is turned, whereby to advance the nut on the bolt upon continued rotation of the bolt to bring said wings into engaging contact with said engagement surfaces.

5. A fastening device including a bridge member adapted to be secured to a primary structure and to bridge an opening in said structure, a socket member adapted to be attached to a secondary structure to be fastened to the primary structure, said socket member comprising a central cup-like portion having a recess therein and a countersunk face portion providing a flange adapted to contact the walls of an opening in the secondary structure to which the socket member is attached, a bolt having a head adapted to be received in said recess and having a shank portion passing through an opening in the bottom of the cup-like portion of said socket member, sealing means between the bolt head and the bottom of said recess and a wing nut threaded on the shank portion of the bolt and including an element for frictionally engaging the threaded portion of the bolt, said bridge member having spaced bridge arms between which said wing nut is adapted to pass in one position of rotation thereof and engagement surfaces adapted to be engaged by the wings of the nut in another position of rotation thereof upon advancement of the nut on the bolt due to turning of the nut relative to the bolt.

6. The combination with primary and secondary plate structures each having an opening therein and adapted to be secured together in overlapping relation, of a socket member permanently secured to the secondary structure and having a cup-like portion registering with the opening in the secondary structure and projecting through the opening in the primary structure, a clamping member including a bolt passing through said socket member and having its head received in the recess provided by said cup-like portion and a self-locking nut threaded on said bolt, and means permanently secured to said primary plate structure providing spaced engagement surfaces to engage said nut in certain positions of rotation thereof and to cause the head of the bolt and said secondary plate structure to be drawn toward said primary plate structure as the nut is threaded toward the head of the bolt.

7. The combination with primary and secondary plate structures each having an opening therein and adapted to be secured together in overlapping relation, of a socket member permanently secured to the side of the secondary plate structure adjacent to the primary plate structure when said structures are secured together, said socket member comprising a central cup-like portion providing a recess and a shear flange portion around said recess and projecting from the face of the socket member to contact the periphery of the opening in said secondary plate structure, said cup-like portion extending through the opening in said primary plate structure and having a diameter less than that of the opening in the primary plate structure, a bridge member permanently secured to the reverse side of the primary plate structure and providing spaced engagement surfaces in alignment with the last mentioned opening, and a clamping member including a threaded bolt having a head adapted to be received in said recess and a shank portion passing through said socket member and between said engagement surfaces, and a self-locking wing nut threaded on said bolt and having wing portions adapted to engage said engagement surfaces in certain positions of rotation of the nut.

8. In a fastening device, a socket member adapted to be permanently secured to a secondary structure to be fastened, said socket member having a central cup-like portion providing a recess, a clamping member comprising a bolt having a head adapted to be received within said recess and a shank portion passing through said cup-like portion and a wing nut threaded on said shank portion, a member adapted to be secured to a primary structure to which said secondary structure is to be clamped, the last mentioned member providing engagement surfaces adapted to be engaged by said wing nut in certain positions of rotation thereof, said engagement surfaces being spaced to permit said wing nut to pass therebetween in other positions of rotation thereof and a spring located between the bolt head and the socket member for retracting said clamping member when said wing nut is in the last mentioned positions of rotation.

9. In a fastening device, a socket member, a clamping member comprising a threaded bolt and a wing nut retained by said socket member and a bridge member having spaced engagement surfaces adapted to be engaged by the wings of said nut, said engagement surfaces being substantially normal to the axis of said bolt and each having a stop at one end thereof to prevent rotation of the nut beyond a pre-determined position and to thereby cause the nut to advance upon said bolt to draw said members together upon continued rotation of the bolt, the wings of said nut being narrower than the space between said surfaces whereby to permit withdrawal of the nut in certain positions of rotation thereof and the length of the wings being such as to provide a substantial overlap of the wings beyond the confronting edges of said surfaces when the wings of the nut are in engagement with said stops, whereby to permit limited lateral movement of said bolt with respect to the second mentioned member without disengagement of the nut from said surfaces.

10. In a device of the character described, a bridge member adapted to be permanently secured to a primary structure and having spaced arms bridging an opening in said structure, each of said arms having an engagement surface and a lug providing a stop at one end of the surface, said lugs being disposed diagonally opposite each other, and means including a clamping member comprising a wing nut adapted to pass between said arms in certain positions of rotation thereof and having wings adapted to engage said stops and to be drawn into contact with said engagement surfaces for clamping the secondary structure to said primary structure.

11. In a device of the character described, a bridge member adapted to be permanently attached to a primary structure and to bridge an opening therein, said bridge member having two spaced and substantially parallel bridge arms, each of said arms having a stop lug and a lip spaced from the stop lug and providing an engagement surface between the lip and the stop lug, the stop lugs and the lips on the two arms being respectively diagonally opposite each other, and clamping means including a wing nut adapted to pass between said arms in certain positions of rotation thereof and having wings adapted to pass over said lips and into engagement with said stop lugs upon rotation of the nut from the position of rotation in which it passes between said arms.

12. In a device of the character described, a bridge member having spaced and substantially parallel arms, each of said arms having a stop lug and an outwardly turned lip spaced from the stop lug and providing an engagement surface between the lip and the stop lug, a wing nut adapted to pass between said arms in certain positions of rotation thereof and to be turned from such positions to a position in which the wings are in engagement with said surfaces, diagonally opposite corners of the wings of said nut being beveled to facilitate turning of the nut from the first named positions to the last named position and clamping means including a bolt adapted to draw said nut into engagement with said surfaces.

13. In a device of the character described, a primary plate structure having an opening therein, a secondary plate structure having an opening therein, a socket member attached to the secondary structure around the opening therein, a member having engaging surfaces attached to said secondary structure, a clamping member retained in said socket member and having a part adapted to detachably engage the second mentioned member, said socket member having a portion extending through the opening in said primary structure for transmitting directly thereto lateral stresses derived from said secondary structure, and said clamping member being movable laterally with respect to the second mentioned member while in engaged position, whereby said socket member relieves said clamping member from shear or bending stress occasioned by relative lateral movement of said primary and secondary structures.

CARL A. SWANSTROM.